J. W. TAYLOR.
VALVE FOR PNEUMATIC TIRES.
APPLICATION FILED OCT. 20, 1913.

1,108,640.

Patented Aug. 25, 1914.

WITNESSES
S. E. Wade
Myron G. Clear

INVENTOR
James Walter Taylor,
BY Munn & Co.
ATTORNEYS

UNITED STATES PATENT OFFICE.

JAMES WALTER TAYLOR, OF LANSING, MICHIGAN, ASSIGNOR OF ONE-THIRD TO GEORGE A. MOHR AND ONE-THIRD TO FRED L. FULTON, BOTH OF LANSING, MICHIGAN.

VALVE FOR PNEUMATIC TIRES.

1,108,640. Specification of Letters Patent. Patented Aug. 25, 1914.

Application filed October 20, 1913. Serial No. 796,178.

*To all whom it may concern:*

Be it known that I, JAMES WALTER TAYLOR, a citizen of the United States, and resident of Lansing, in the county of Ingham and State of Michigan, have invented an Improvement in Valves for Pneumatic Tires, of which the following is a specification.

My present invention relates to a valve for pneumatic tires, my object being to provide certain means by which to eliminate the danger of leakage and preserve and hold the flexible gaskets or washers utilized therein.

Figure 1:
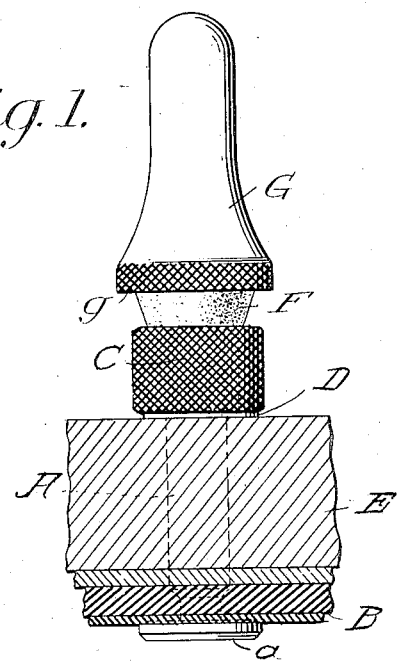
Figure 2:
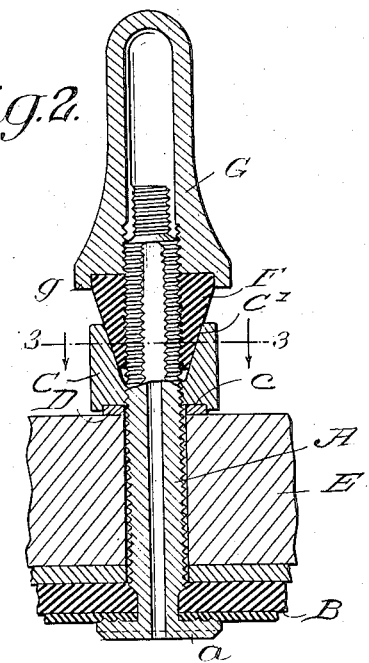
Figure 3:
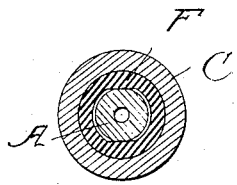
Figure 4:
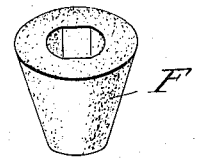

In the accompanying drawing, which illustrates my invention, Figure 1, is a side elevation of my improvements illustrating their practical application. Fig. 2, is a central vertical section taken therethrough. Fig. 3, is a detail cross section taken substantially on line 3—3 of Fig. 2, and Fig. 4, is a perspective view of the conical gasket removed.

Referring now to these figures the valve stem A is of substantially the usual form, being threaded throughout the major portion of its length and having a flat circular enlargement or flange $a$ at its inner end which bears against the inner peripheral portion of the tire indicated at B.

A nut or bur C is threaded for engagement upon the inner projecting portion of the valve tube or stem A and is provided upon its inner face with a groove $c$ surrounding its bore, this groove being adapted to receive a flat circular face D which surrounds the valve stem or tube A and is forced against the inner peripheral surface of the rim E by means of the nut or bur C, the grooved inner face of the latter leaving a surrounding retaining ring which supports and holds the washer D firmly in position and prevents the same from spreading.

Extending inwardly from its outer face and surrounding the outer end of its threaded bore, the nut or bur C is provided with a conical recess $c'$ which receives the lower smaller end of a conical gasket F adapted to surround the valve stem or tube A as particularly shown in Figs. 2 and 3 and the upper enlarged end of which is engaged within the grooved inner end of an internally threaded thimble G adapted for engagement upon the exposed end of the valve tube and the grooved inner face of which thus forms a retaining ring $g$ surrounding the gasket F to prevent the latter from spreading. Thus by tightly screwing the nut or bur C against the inner face of the rim E, washer D is firmly and evenly seated and held. In like manner by screwing the thimble G onto the outer portion of the valve tube or stem A to a desired extent, the lower smaller end of the conical gasket F is forced into firm and even contact with the outer surface of the valve stem or tube by virtue of its movement within the conical recess of the nut or bur C, it being noted that the retaining ring $g$ of the thimble G holds the gasket F against spreading and that the said gasket creates a tension upon the thimble G at all times to prevent the latter from working loose. In this manner I prevent leakage around the valve tube or stem A, utilizing such means as will also assist in preventing leakage from the thimble G, such means being in the form of a conical gasket, the action of which depends upon the coöperation of the nut or bur C and the thimble G.

It is to be noted by comparison of Figs. 2 and 3 that the valve stem A is provided with diametrically opposite flattened portions extending longitudinally thereof, and which coöperate with diametrically opposed flat faces of the bore of the gasket F, the engagement of these parts being particularly shown in Fig. 3, the purpose of which is to resist tendency of the gasket to rotate when the thimble G is screwed inwardly thereagainst. By this means the gasket is forced into tightly sealed position by a wholly longitudinal movement thereof.

I claim:—

The combination of a threaded valve tube, a nut or bur threaded on the valve stem and having a grooved inner face, a washer extending within the groove and adapted to bear against a wheel rim and the like, the bore of said nut or bur being enlarged at its opposite end to form a conical recess at the outer face thereof, a flexible conical gasket having its inner end projecting within the conical recess of the nut or bur, and a thimble threaded upon the inner end of the valve stem and having a grooved inner face receiving the enlarged end of the gasket, the said grooved faces of the thimble and nut or bur forming retaining rings to respectively prevent the gasket and the washer from spreading, all for the purpose described.

JAMES WALTER TAYLOR.

Witnesses:
CHARLES F. HAIGHT,
ELIAS C. MARTIN.